US012673872B2

(12) United States Patent
Kobayashi et al.

(10) Patent No.: US 12,673,872 B2
(45) Date of Patent: Jul. 7, 2026

(54) PRODUCTION METHOD FOR CHEMICAL PRODUCTS AND CARBIDES

(71) Applicants: ENEOS Corporation, Tokyo (JP);
Bridgestone Corporation, Tokyo (JP)

(72) Inventors: Masahide Kobayashi, Tokyo (JP);
Naoko Urushizako, Tokyo (JP); Rina Iwamoto, Tokyo (JP); Ryoji Ida, Tokyo (JP); Masahiro Hojo, Tokyo (JP);
Seiichi Tahara, Tokyo (JP); Akira Okuno, Tokyo (JP); Marino Kuno Itoda, Tokyo (JP)

(73) Assignees: ENEOS CORPORATION, Tokyo (JP);
BRIDGESTONE CORPORATION, Tokyo (JP)

( * ) Notice: Subject to any disclaimer, the term of this patent is extended or adjusted under 35 U.S.C. 154(b) by 203 days.

(21) Appl. No.: 18/832,709

(22) PCT Filed: Jan. 17, 2023

(86) PCT No.: PCT/JP2023/001222
§ 371 (c)(1),
(2) Date: Jul. 24, 2024

(87) PCT Pub. No.: WO2023/145544
PCT Pub. Date: Aug. 3, 2023

(65) Prior Publication Data
US 2025/0091882 A1      Mar. 20, 2025

(30) Foreign Application Priority Data
Jan. 27, 2022    (JP) ................................. 2022-010859

(51) Int. Cl.
*C01B 32/90*      (2017.01)
*B01J 21/12*      (2006.01)
(Continued)

(52) U.S. Cl.
CPC ............... *C01B 32/90* (2017.08); *B01J 21/12* (2013.01); *B01J 23/883* (2013.01); *B01J 23/888* (2013.01);
(Continued)

(58) Field of Classification Search
CPC ......... C01B 32/90; B01J 21/12; B01J 23/883; B01J 23/888; B01J 37/0213;
(Continued)

(56) References Cited

U.S. PATENT DOCUMENTS 4,284,616 A    8/1981  Solbakken et al.
5,849,964 A    12/1998  Holighaus et al.
(Continued)

FOREIGN PATENT DOCUMENTS

JP      S55-500113 A    2/1980
JP      2003-129066 A    5/2003
(Continued)

OTHER PUBLICATIONS

ISR for PCT/JP2023/001222, dated Feb. 28, 2023 (w/ translation).
IPRP for PCT/JP2023/001222, dated Jul. 30, 2024 (w/ translation).

*Primary Examiner* — Ellen M McAvoy
(74) *Attorney, Agent, or Firm* — Greenblum & Bernstein, P.L.C.

(57) ABSTRACT
Provided is a method for producing chemical products and carbides, including: a pyrolysis step of obtaining a first gas fraction, a pyrolysis oil, and a residual fraction by pyrolysis of a crushed material of waste tires; a carbide recovery step of recovering a carbide from the residual fraction; a hydrogenolysis step of obtaining a second gas fraction, a light fraction, and a heavy fraction by hydrogenolysis of a raw material oil containing at least a part of the pyrolysis oil; and a steam-cracking step of obtaining a chemical product and a raw material for producing a carbide by steam cracking of a
(Continued)

steam-cracking raw material oil containing at least a part of the light fraction.

11 Claims, 2 Drawing Sheets

(51) Int. Cl.

| | |
|---|---|
| *B01J 23/883* | (2006.01) |
| *B01J 23/888* | (2006.01) |
| *B01J 37/02* | (2006.01) |
| *B01J 37/08* | (2006.01) |
| *C10B 53/07* | (2006.01) |
| *C10G 69/06* | (2006.01) |

(52) U.S. Cl.
CPC ....... *B01J 37/0213* (2013.01); *B01J 37/0236* (2013.01); *B01J 37/08* (2013.01); *C10B 53/07* (2013.01); *C10G 69/06* (2013.01); *C10G 2300/1003* (2013.01); *C10G 2400/20* (2013.01); *C10G 2400/30* (2013.01)

(58) Field of Classification Search
CPC ....... B01J 37/0236; B01J 37/08; C10B 53/07; C10G 69/06; C10G 2300/1003; C10G 2400/20; C10G 2400/30; C10G 1/002; C10G 1/10; C10G 47/00; C10G 9/36; C08J 11/12
See application file for complete search history.

(56) References Cited

U.S. PATENT DOCUMENTS

| | | | |
|---|---|---|---|
| 2009/0314622 A1* | 12/2009 | Joo .......................... | C10G 1/10 |
| | | | 202/117 |
| 2019/0161683 A1 | 5/2019 | Narayanaswamy et al. | |
| 2020/0017772 A1 | 1/2020 | Ramamurthy et al. | |
| 2024/0076558 A1* | 3/2024 | Coustham .............. | C10G 21/20 |
| 2025/0145897 A1* | 5/2025 | Kobayashi .............. | C08J 11/12 |

FOREIGN PATENT DOCUMENTS

| | | |
|---|---|---|
| JP | 2019-533041 A | 11/2019 |
| JP | 2020-514298 A | 5/2020 |
| WO | WO 79/00625 A1 | 9/1979 |
| WO | 2010/137352 A1 | 12/2010 |
| WO | WO 2018/055555 A1 | 3/2018 |
| WO | WO 2018/127813 A1 | 7/2018 |
| WO | 2021/204817 A1 | 10/2021 |

* cited by examiner

PRODUCTION METHOD FOR CHEMICAL PRODUCTS AND CARBIDES

TECHNICAL FIELD

The present invention relates to a method for producing chemical products and carbides.

BACKGROUND ART

Recently, as a method for reusing a waste material such as waste tires, waste rubbers, and waste plastics, a conversion into a chemical product by pyrolysis or the like has been considered (for example, Patent Literature 1).

CITATION LIST

Patent Literature

Patent Literature 1: Japanese Unexamined Patent Publication No. 2019-533041

SUMMARY OF INVENTION

Technical Problem

In the reuse of the waste material, the development of various processes is desired because the type, the quality, or the like of the waste material is not necessarily constant, and there is a need for a process in which the existing facility can be utilized.

An object of the present invention is to provide a novel method for producing chemical products and carbides, in which a chemical product can be efficiently produced from waste tires, and a carbide can also be efficiently obtained.

Solution to Problem

One aspect of the present invention, for example, relates to [1] to described below.

[1] A method for producing chemical products and carbides, including:

a pyrolysis step of obtaining a first gas fraction, a pyrolysis oil, and a residual fraction by pyrolysis of a crushed material of waste tires;

a carbide recovery step of recovering a carbide from the residual fraction;

a hydrogenolysis step of obtaining a second gas fraction, a light fraction with a boiling point of 350° C. or lower, and a heavy fraction with a boiling point higher than 350° C. by hydrogenolysis of a raw material oil containing at least a part of the pyrolysis oil; and a steam-cracking step of obtaining a chemical product and a raw material for producing a carbide consisting of a heavy distillate with a 10% distillation temperature of 190° C. or higher by steam cracking of a steam-cracking raw material oil containing at least a part of the light fraction, in which a pyrolysis temperature of the pyrolysis is 350 to 750° C., and in the hydrogenolysis step, the raw material oil contains a low-boiling-point raw material with a boiling point of 350° C. or lower and a high-boiling-point raw material with a boiling point higher than 350° C., and a content of the high-boiling-point raw material is 15% by mass or more on the basis of a total amount of the raw material oil.

[2] The method according to [1], in which in the pyrolysis step, an amount of the pyrolysis oil with respect to a total amount of the first gas fraction, the pyrolysis oil, and the residual fraction is 40% by mass or more.

[3] The method according to [1] or [2], in which in the pyrolysis step, an amount of the first gas fraction with respect to the total amount of the first gas fraction, the pyrolysis oil, and the residual fraction is 25% by mass or less.

[4] The method according to any one of [1] to [3], in which in the pyrolysis step, the amount of the pyrolysis oil with respect to the total amount of the first gas fraction, the pyrolysis oil, and the residual fraction is 80% by mass or less.

[5] The method according to any one of [1] to [4], in which in the pyrolysis oil, a 10% distillation temperature is 90° C. or higher, and a 90% distillation temperature is 350° C. or higher.

[6] The method according to any one of [1] to [5], in which in the hydrogenolysis step, the content of the high-boiling-point raw material in the raw material oil is 70% by mass or less on the basis of the total amount of the raw material oil.

[7] The method according to any one of [1] to [6], in which the hydrogenolysis step is a step of performing hydrogenolysis on the raw material oil in the presence of a hydrogenolysis catalyst.

[8] The method according to [7], in which the hydrogenolysis catalyst includes a Ni-based catalyst.

[9] The method according to any one of [1] to [8], in which in the hydrogenolysis step, a nitrogen fraction in the raw material oil is 2000 mass ppm or more, and a nitrogen fraction in the light fraction is 25 mass ppm or less.

[10] The method according to any one of [1] to [9], in which the raw material oil in the hydrogenolysis step is the pyrolysis oil.

[11] The method according to any one of [1] to [10], further including a carbide production step of obtaining a carbide by pyrolysis or incomplete combustion of the raw material for producing a carbide.

Advantageous Effects of Invention

According to the present invention, the novel method for producing chemical products and carbides is provided in which the chemical product can be efficiently produced from the waste tires, and the carbide can also be efficiently obtained.

DESCRIPTION OF EMBODIMENTS

Figure 1:
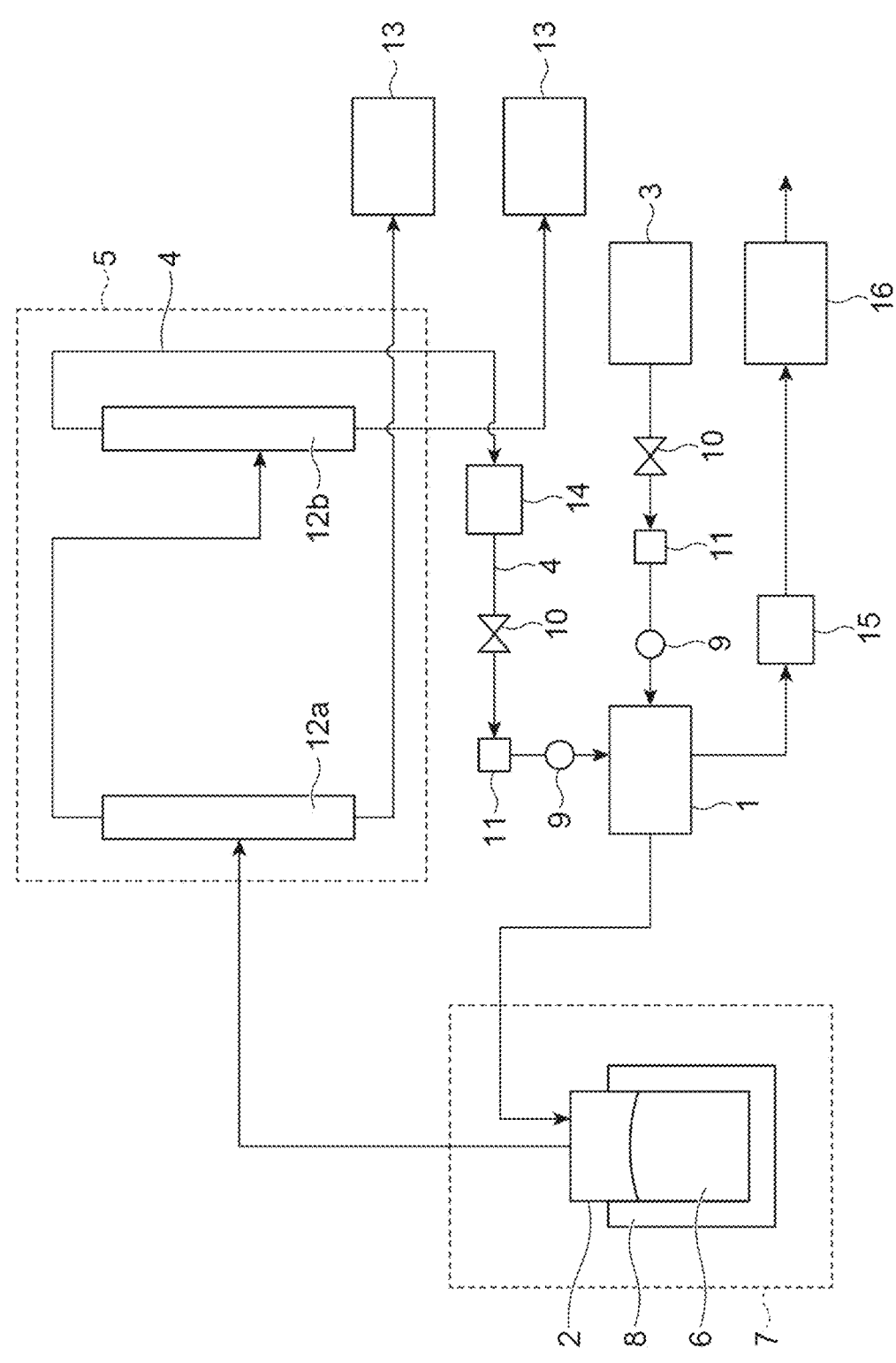
FIG. 1 is a schematic view illustrating an example of a pyrolyzer.

Hereinafter, a preferred embodiment of the present invention will be described in detail.

A method or chemical products and carbides of this embodiment includes a pyrolysis step of obtaining a first gas fraction, a pyrolysis oil, and a residual fraction by the pyrolysis of the crushed material of waste tires, a carbide recovery step of recovering a carbide from the residual fraction, a hydrogenolysis step of obtaining a second gas fraction, a light fraction with a boiling point of 350° C. or lower, and a heavy fraction with a boiling point higher than 350° C. by the hydrogenolysis of a raw material oil containing at least a part of the pyrolysis oil, and a steam-cracking step of obtaining a chemical product and a raw material for producing a carbide consisting of a heavy distillate with a 10% distillation temperature of 190° C. or higher by the steam cracking of a steam-cracking raw material oil containing at least a part of the light fraction.

In the pyrolysis step of this embodiment, the pyrolysis temperature of the pyrolysis is 350 to 750° C. In addition, in the hydrogenolysis step of this embodiment, the raw material oil contains a low-boiling-point raw material with a boiling point of 350° C. or lower and a high-boiling-point raw material with a boiling point higher than 350° C., and the content of the high-boiling-point raw material is 15% by mass or more on the basis of the total amount of the raw material oil.

In the method of this embodiment, by setting the pyrolysis temperature in the pyrolysis step to be in the predetermined range described above and the raw material in the hydrogenation step to contain the low-boiling-point raw material and the high-boiling-point raw material, it is possible to efficiently produce the chemical product from the waste tires.

In addition, in the method of this embodiment, by setting the pyrolysis temperature in the pyrolysis step to be in the predetermined range described above, it is possible to recover a powdered carbide, which can be used as a rubber additive, a resin additive, a colorant, and the like, from the residual fraction in the pyrolysis step. In addition, in the method of this embodiment, by setting the pyrolysis temperature in the pyrolysis step to be in the predetermined range described above and the raw material in the hydrogenation step to contain the low-boiling-point raw material and the high-boiling-point raw material, the heavy distillate obtained in the steam-cracking step is suitable as the raw material for producing a carbide (in particular, carbon black). Therefore, in the method of this embodiment, it is also possible to efficiently produce the carbide while efficiently producing the chemical product.

Hereinafter, each step of the present invention will be described in detail.

(Pyrolysis Step)

The pyrolysis step is a step of obtaining the first gas fraction, the pyrolysis oil, and the residual fraction by the pyrolysis of the crushed material of the waste tires (hereinafter, also simply referred to as a waste material).

The waste tires may contain a metal fraction. For example, the waste tires may contain a metal fraction such as a steel cord or a wire, which is the aggregate of the tire.

In a case where the waste tires contain the metal fraction, the method of this embodiment may further include a removal step of removing the metal fraction from the waste tires or the crushed material thereof. A method for removing the metal fraction from the waste tires or the crushed material thereof is not particularly limited, and examples thereof include a method for removing the metal fraction using a magnet, a sieve, or the like.

Note that, it is not necessary to remove the metal fraction in the waste tires before the pyrolysis step. For example, in a case where the waste tires contain the metal fraction, in the pyrolysis step, the first gas fraction, the pyrolysis oil, and a mixture of the residual fraction and the metal fraction are obtained. The method of this embodiment may further include a removal step of removing the metal fraction from the mixture. A method for removing the metal fraction from the mixture is not particularly limited, and examples thereof include a method for removing the metal fraction using a magnet, a sieve, or the like.

A method for crushing the waste tires is not particularly limited, and for example, may be a method such as mechanical pulverization by a uniaxial pulverizer or a biaxial pulverizer, pulverization by a water jet, frost pulverization, and laser pulverization.

The pyrolysis of the crushed material of the waste tires, for example, can be performed by accommodating the crushed material of the waste tires in a pyrolytic furnace, supplying high-temperature gas to the pyrolytic furnace, and bringing the crushed material of the waste tires into contact with the high-temperature gas. It is preferable that the high-temperature gas is oxygen-free gas that does not substantially contain oxygen (for example, gas with an oxygen content of 1% by volume or less). The high-temperature gas may be gas other than oxygen and an oxide, and for example, may be inert gas such as nitrogen, argon, and helium, hydrogen, hydrocarbon having 1 to 4 carbon atoms, and the like. The pyrolytic furnace is not particularly limited, and for example, may be a pot-type pyrolytic furnace, a fluid bed-type pyrolytic furnace, a kiln-type pyrolytic furnace, or the like.

The pyrolysis temperature in the pyrolysis step (the temperature of the high-temperature gas) is 350° C. or higher, and from the viewpoint of further improving a chemical product yield, from the viewpoint of more easily obtaining the powdered carbide from the residual fraction, from the viewpoint of further improving dispersibility when the obtained powdered carbide is added to a resin, an elastomer, or the like, and from the viewpoint of making the heavy distillate obtained in the steam-cracking step more suitable as the raw material for producing a carbide (in particular, a raw material for producing carbon black), is preferably 370° C. or higher, and more preferably 390° C. or higher. In addition, the pyrolysis temperature in the pyrolysis step (the temperature of the high-temperature gas) may be 750° C. or lower, and for example, from the viewpoint of further improving the chemical product yield, from the viewpoint of more easily obtaining the powdered carbide from the residual fraction, and from the viewpoint of making the heavy distillate obtained in the steam-cracking step more suitable as the raw material for producing a carbide (in particular, the raw material for producing carbon black), is preferably 730° C. or lower, and more preferably 710° C. or lower. Note that, according to such a temperature range, there is a tendency that it is easier to satisfy the amount of a preferred product described below (the first gas fraction, the pyrolysis oil, and the residual fraction), and it is easier to obtain the raw material oil in which the content of the high-boiling-point raw material is in a preferred range.

That is, the pyrolysis temperature in the pyrolysis step (the temperature of the high-temperature gas), for example, may be 350 to 750° C., 350 to 730° C., 350 to 710° C., 370 to 750° C., 370 to 730° C., 370 to 710° C., 390 to 750° C., 390 to 730° C., or 390 to 710° C.

The pyrolysis may be implemented in the presence of a pyrolysis catalyst, or may be implemented in the absence of the pyrolysis catalyst. As the pyrolysis catalyst, a catalyst used in ordinary petrochemical pyrolysis can be used without any particular limitation. The pyrolysis catalyst may be an acidic catalyst, or may be a basic catalyst. Examples of the acidic catalyst include a catalyst containing an aluminosilicate. Examples of the aluminosilicate include a smectite group such as zeolite and montmorillonite. Examples of a catalyst containing montmorillonite include clays or a mineral such as activated clay, acid clay, and bentonite. In addition, as the basic catalyst, for example, a carbonate such as sodium carbonate can be used.

Various conditions of the pyrolysis, for example, may be suitably adjusted such that the obtained component ratio, the characteristic of the obtained pyrolysis oil, or the like is in a preferred range described below.

In the pyrolysis step, the first gas fraction, the pyrolysis oil, and the residual fraction are obtained. Note that, the residual fraction, as described above, may be obtained as the mixture with the metal fraction. In the pyrolysis step, for example, pyrolysis gas is produced in the pyrolytic furnace, and by cooling the pyrolysis gas, it is possible to recover the pyrolysis oil as an oil fraction. In addition, in the pyrolysis step, for example, as residual gas after recovering the oil fraction by cooling the pyrolysis gas, the first gas fraction can be recovered. In addition, in the pyrolysis step, for example, as a solid fraction remaining in the pyrolytic furnace after the pyrolysis, the residual fraction can be recovered.

In the pyrolysis step, the amount of the pyrolysis oil with respect to the total amount of the first gas fraction, the pyrolysis oil, and the residual fraction, for example, may be 40% by mass or more. From the viewpoint of improving the yield of the chemical product obtained via the hydrogenolysis step and the steam-cracking step, in the pyrolysis step, the amount of the pyrolysis oil with respect to the total amount of the first gas fraction, the pyrolysis oil, and the residual fraction is preferably 45% by mass or more, more preferably 48% by mass or more, and even more preferably 50% by mass or more, and may be 51% by mass or more or 52% by mass or more. In addition, in the pyrolysis step, the amount of the pyrolysis oil with respect to the total amount of the first gas fraction, the pyrolysis oil, and the residual fraction, for example, may be 80% by mass or less, and is preferably 75% by mass or less, more preferably 70% by mass or less, and even more preferably 65% by mass or less, and may be 60% by mass or less.

That is, in the pyrolysis step, the amount of the pyrolysis oil with respect to the total amount of the first gas fraction, the pyrolysis oil, and the residual fraction, for example, may be 40 to 80% by mass, 40 to 75% by mass, 40 to 70% by mass, 40 to 65% by mass, 40 to 60% by mass, 45 to 80% by mass, 45 to 75% by mass, 45 to 70% by mass, 45 to 65% by mass, 45 to 60% by mass, 48 to 80% by mass, 48 to 75% by mass, 48 to 70% by mass, 48 to 65% by mass, 48 to 60% by mass, 50 to 80% by mass, 50 to 75% by mass, 50 to 70% by mass, 50 to 65% by mass, 50 to 60% by mass, 51 to 80% by mass, 51 to 75% by mass, 51 to 70% by mass, 51 to 65% by mass, 51 to 60% by mass, 52 to 80% by mass, 52 to 75% by mass, 52 to 70% by mass, 52 to 65% by mass, or 52 to 60% by mass.

Note that, in the related art, in a method for treating the waste material, from the viewpoint of treating the maximum amount of the waste material, it is mainly considered to implement the pyrolysis in a condition where there are fewer residual fractions and more gas fractions (for example, Patent Literature 1). In contrast, in the method of this embodiment, by purposely performing the pyrolysis in a condition where the amount of the pyrolysis oil is in the range described above, the yield of the chemical product obtained via the hydrogenolysis step and the steam-cracking step is further improved, the powdered carbide is more easily obtained from the residual fraction, and the heavy distillate obtained in the steam-cracking step is more suitable as the raw material for producing a carbide.

In the pyrolysis step, the amount of the first gas fraction with respect to the total amount of the first gas fraction, the pyrolysis oil, and the residual fraction, for example, is 25% by mass or less. From the viewpoint of improving the yield of the chemical product obtained via the hydrogenolysis step and the steam-cracking step, in the pyrolysis step, the amount of the first gas fraction with respect to the total amount of the first gas fraction, the pyrolysis oil, and the residual fraction is preferably 20% by mass or less, and more preferably 15% by mass or less, and may be 13% by mass or less or 10% by mass or less. According to a pyrolysis condition where the amount of the first gas fraction is 25% by mass or less, a decrease in the yield of the pyrolysis oil due to the excessive progress of the pyrolysis of the crushed material can be suppressed. That is, according to the pyrolysis condition described above, the pyrolysis oil produced by the pyrolysis of the crushed material can be prevented from being further pyrolyzed to be the gas fraction, the yield of the pyrolysis oil that can be the chemical product via the hydrogenolysis step and the steam-cracking step can be further improved, and the yield of the chemical product is further improved.

In addition, the amount of the first gas fraction with respect to the total amount of the first gas fraction, the pyrolysis oil, and the residual fraction, for example, may be 0.1% by mass or more, 0.5% by mass or more, 0.7% by mass or more, 1% by mass or more, 1.3% by mass or more, or 1.5% by mass or more. In a case where the crushed material, for example, contains a chlorine fraction, a part of the chlorine fraction in the crushed material is gasified as chlorine gas or the like by the pyrolysis. That is, a part of the chlorine fraction contained in the crushed material is removed as a part of the first gas fraction. Accordingly, in a case where a predetermined amount of the first gas fraction is generated in the pyrolysis step, it is possible to reduce the chlorine fraction contained in the pyrolysis oil, compared to a case where the first gas fraction is not generated in the pyrolysis step. Therefore, according to a pyrolysis condition where the predetermined amount of the first gas fraction is generated, the purity of the chemical product obtained via the hydrogenolysis step for the pyrolysis oil and the steam-cracking step for the steam-cracking raw material oil is further improved. In addition, in a case where the catalyst is used in the hydrogenolysis step, the poisoning of the catalyst due to the chlorine fraction can be suppressed, and the degradation of the catalyst can be suppressed. Note that, in the above description, the chlorine fraction is exemplified, but the same applies to a case where the crushed material contains a nitrogen fraction, a sulfur fraction, a halogen element fraction other than the chlorine fraction, and the like.

That is, the amount of the first gas fraction with respect to the total amount of the first gas fraction, the pyrolysis oil, and the residual fraction, for example, may be 0.1 to 25% by mass, 0.1 to 20% by mass, 0.1 to 15% by mass, 0.1 to 13% by mass, 0.1 to 10% by mass, 0.5 to 25% by mass, 0.5 to 20% by mass, 0.5 to 15% by mass, 0.5 to 13% by mass, 0.5 to 10% by mass, 0.7 to 25% by mass, 0.7 to 20% by mass, 0.7 to 15% by mass, 0.7 to 13% by mass, 0.7 to 10% by mass, 1 to 25% by mass, 1 to 20% by mass, 1 to 15% by mass, 1 to 13% by mass, 1 to 10% by mass, 1.3 to 25% by mass, 1.3 to 20% by mass, 1.3 to 15% by mass, 1.3 to 13% by mass, 1.3 to 10% by mass, 1.5 to 25% by mass, 1.5 to 20% by mass, 1.5 to 15% by mass, 1.5 to 13% by mass, or 1.5 to 10% by mass.

In the pyrolysis step, the amount of the residual fraction with respect to the total amount of the first gas fraction, the pyrolysis oil, and the residual fraction, for example, may be 10% by mass or more, and from the viewpoint of improving the yield of the chemical product obtained via the hydrogenolysis step and the steam-cracking step and from the viewpoint of improving the yield of the carbide recovered as the residual fraction, is preferably 15% by mass or more, and more preferably 20% by mass or more. According to a pyrolysis condition where the amount of the residual fraction is 10% by mass or more, a decrease in the yield of the pyrolysis oil due to the excessive progress of the pyrolysis of the crushed material can be suppressed. That is, according to the pyrolysis condition described above, the pyrolysis oil produced by the pyrolysis of the crushed material can be prevented from being further pyrolyzed to be the gas fraction, the yield of the pyrolysis oil that can be the chemical product via the hydrogenolysis step and the steam-cracking step can be further improved, and the yield of the chemical product is further improved. In addition, the range described above is also preferable from the viewpoint of recovering more carbides.

In addition, the amount of the residual fraction with respect to the total amount of the first gas fraction, the pyrolysis oil, and the residual fraction, for example, may be 60% by mass or less, and from the viewpoint of improving the yield of the chemical product obtained via the hydrogenolysis step and the steam-cracking step and from the viewpoint of more easily obtaining the powdered carbide from the residual fraction, is preferably 55% by mass or less, more preferably 50% by mass or less, and even more preferably 45% by mass or less, and may be 40% by mass or less. As the amount of the residual fraction with respect to the total amount of the first gas fraction, the pyrolysis oil, and the residual fraction increases, the amount of the first gas fraction and the pyrolysis oil with respect to the total amount of the first gas fraction, the pyrolysis oil, and the residual fraction decreases. Therefore, according to a pyrolysis condition where the amount of the residual fraction is 60% by mass or less, the crushed material to be the pyrolysis oil can be prevented from remaining as the residual fraction, the yield of the pyrolysis oil that can be the chemical product via the hydrogenolysis step and the steam-cracking step can be improved, and the yield of the chemical product is further improved.

That is, the amount of the residual fraction with respect to the total amount of the first gas fraction, the pyrolysis oil, and the residual fraction, for example, may be 10 to 60% by mass, 10 to 55% by mass, 10 to 50% by mass, 10 to 45% by mass, 10 to 40% by mass, 15 to 60% by mass, 15 to 55% by mass, 15 to 50% by mass, 15 to 45% by mass, 15 to 40% by mass, 20 to 60% by mass, 20 to 55% by mass, 20 to 50% by mass, 20 to 45% by mass, or 20 to 40% by mass.

The first gas fraction, for example, may be a component that is a gas at ordinary pressure and 20° C., among the products produced by the pyrolysis. The first gas fraction, for example, may contain hydrogen, hydrocarbon having 1 to 4 carbon atoms, or the like.

A method for recovering the first gas fraction is not particularly limited. The first gas fraction, for example, can be recovered as the residual gas after recovering the oil fraction (the pyrolysis oil) by cooling the pyrolysis gas produced by the pyrolysis.

The first gas fraction, for example, can be reused as the high-temperature gas (the oxygen-free gas) in the pyrolysis. That is, the first gas fraction may be heated and supplied to the pyrolytic furnace as a part (or all) of the high-temperature gas (the oxygen-free gas). In addition, the first gas fraction, for example, can be used as combustion gas for heating a pyrolysis part in the pyrolysis step or combustion gas for a heating furnace in other steps.

The pyrolysis oil, for example, may be a component that is a liquid at ordinary pressure and 20° C., among the products produced by the pyrolysis. A method for recovering the pyrolysis oil is not particularly limited. The pyrolysis oil, for example, can be recovered as the oil fraction distilled from the pyrolytic furnace. That is, the pyrolysis oil, for example, can be recovered as the oil fraction that is condensed by cooling the pyrolysis gas produced by the pyrolysis.

The distillation characteristic of the pyrolysis oil is not particularly limited, and for example, may be a characteristic that can be used as the raw material oil in the hydrogenolysis step.

The 10% distillation temperature (T10) of the pyrolysis oil, for example, may be 90° C. or higher, and from the viewpoint of making the pyrolysis oil more suitable as the raw material oil in the hydrogenolysis step, is preferably 140° C. or higher, more preferably 150° C. or higher, and even more preferably 155° C. or higher. In addition, the 10% distillation temperature of the pyrolysis oil, for example, may be 200° C. or lower, 190° C. or lower, or 180° C. or lower.

That is, the 10% distillation temperature (T10) of the pyrolysis oil, for example, may be 90 to 200° C., 90 to 190° C., 90 to 180° C., 140 to 200° C., 140 to 190° C., 140 to 180° C., 150 to 200° C., 150 to 190° C., 150 to 180° C., 155 to 200° C., 155 to 190° C., or 155 to 180° C.

The 90% distillation temperature (T90) of the pyrolysis oil, for example, may be 350° C. or higher, and from the viewpoint of making the pyrolysis oil more suitable as the raw material oil in the hydrogenolysis step, is preferably 370° C. or higher, more preferably 390° C. or higher, and even more preferably 400° C. or higher, and may be 410° C. or higher, 420° C. or higher, 430° C. or higher, 440° C. or higher, or 450° C. or higher. In addition, the 90% distillation temperature (T90) of the pyrolysis oil, for example, may be 650° C. or lower, and may be preferably 600° C. or lower, and more preferably 550° C. or lower.

That is, the 90% distillation temperature (T90) of the pyrolysis oil, for example, may be 350 to 650° C., 350 to 600° C., 350 to 550° C., 370 to 650° C., 370 to 600° C., 370 to 550° C., 390 to 650° C., 390 to 600° C., 390 to 550° C., 400 to 650° C., 400 to 600° C., 400 to 550° C., 410 to 650° C., 410 to 600° C., 410 to 550° C., 420 to 650° C., 420 to 600° C., 420 to 550° C., 430 to 650° C., 430 to 600° C., 430 to 550° C., 440 to 650° C., 440 to 600° C., 440 to 550° C., 450 to 650° C., 450 to 600° C., or 450 to 550° C.

It is preferable that the pyrolysis oil contains a low-boiling-point oil with a boiling point of 350° C. or lower and a high-boiling-point oil with a boiling point higher than 350° C.

The content of the high-boiling-point oil in the pyrolysis oil, for example, may be 10% by mass or more on the basis of the total amount of the pyrolysis oil, and from the viewpoint of making the pyrolysis oil more suitable as the raw material oil in the hydrogenolysis step, is preferably 15% by mass or more, and more preferably 20% by mass or more, and may be 25% by mass or more, 30% by mass or more, or 35% by mass or more. In this embodiment, by purposely adjusting the condition of the pyrolysis step such that there are more high-boiling-point oils in the pyrolysis oil, there is a tendency that the pyrolysis oil is more suitable as the raw material oil in the hydrogenolysis step, and the yield of the chemical product is further improved. More specifically, in this embodiment, in the hydrogenolysis step described below, the pyrolysis oil is decomposed, and the second gas fraction, the light fraction with a boiling point of 350° C. or lower, and the heavy fraction with a boiling point higher than 350° C. are obtained. Then, in the hydrogenolysis step, the boiling point of the high-boiling-point oil is decreased such that the high-boiling-point oil can be the light fraction. In the steam-cracking step described below, the light fraction is a substance supplied as the raw material for producing the chemical product. Therefore, by purposely adjusting the condition of the pyrolysis step such that there are more high-boiling-point oils in the pyrolysis oil, there is a tendency that the pyrolysis oil is more suitable as the raw material oil in the hydrogenolysis step, and the yield of the chemical product is further improved. Accordingly, there is a tendency that the heavy distillate obtained in the steam-cracking step is more suitable as the raw material for producing a carbide.

The content of the high-boiling-point oil in the pyrolysis oil, for example, may be 70% by mass or less, 65% by mass or less, 60% by mass or less, 55% by mass or less, or 50% by mass or less, on the basis of the total amount of the pyrolysis oil.

That is, the content of the high-boiling-point oil in the pyrolysis oil, for example, may be 10 to 70% by mass, 10 to 65% by mass, 10 to 60% by mass, 10 to 55% by mass, 10 to 50% by mass, 15 to 70% by mass, 15 to 65% by mass, 15 to 60% by mass, 15 to 55% by mass, 15 to 50% by mass, 20 to 70% by mass, 20 to 65% by mass, 20 to 60% by mass, 20 to 55% by mass, 20 to 50% by mass, 25 to 70% by mass, 25 to 65% by mass, 25 to 60% by mass, 25 to 55% by mass, 25 to 50% by mass, 30 to 70% by mass, 30 to 65% by mass, 30 to 60% by mass, 30 to 55% by mass, 30 to 50% by mass, 35 to 70% by mass, 35 to 65% by mass, 35 to 60% by mass, 35 to 55% by mass, or 35 to 50% by mass, on the basis of the total amount of the pyrolysis oil.

The pyrolysis oil may contain a nitrogen fraction, a sulfur fraction, a chlorine fraction, a halogen element, and the like.

The nitrogen fraction of the pyrolysis oil, for example, may be 100 mass ppm or more, 2000 mass ppm or more, 2500 mass ppm or more, or 3000 mass ppm or more. In this embodiment, even in a case where there are more nitrogen fractions in the pyrolysis oil, the nitrogen fraction is inverted to a gas component such as ammonia by the hydrogenaration in the hydrogenolysis step, and can be easily separated from a liquid product. Then, by supplying the liquid product in which the nitrogen fraction is considerably reduced to the steam-cracking step, it is possible to easily obtain the chemical product with a high purity (the chemical product mixed with fewer nitrogen fractions). The nitrogen fraction of the pyrolysis oil, for example, may be 20000 mass ppm or less, 15000 mass ppm or less, or 10000 mass ppm or less. In a case where the nitrogen fraction is 20000 mass ppm or less, it is possible to more remarkably reduce the nitrogen fraction of the liquid product after the hydrogenolysis step.

That is, the nitrogen fraction of the pyrolysis oil, for example, may be 100 to 20000 mass ppm, 100 to 15000 mass ppm, 100 to 10000 mass ppm, 2000 to 20000 mass ppm, 2000 to 15000 mass ppm, 2000 to 10000 mass ppm, 2500 to 20000 mass ppm, 2500 to 15000 mass ppm, 2500 to 10000 mass ppm, 3000 to 20000 mass ppm, 3000 to 15000 mass ppm, or 3000 to 10000 mass ppm.

The sulfur fraction of the pyrolysis oil, for example, may be 10 mass ppm or more, 100 mass ppm or more, 500 mass ppm or more, or 1000 mass ppm or more. In this embodiment, even in a case where there are more sulfur fractions in the pyrolysis oil, the sulfur fraction is inverted to a gas component such as hydrogen sulfide by the hydrogenaration in the hydrogenolysis step, and can be easily separated from the liquid product. Then, by supplying the liquid product in which the sulfur fraction is considerably reduced to the steam-cracking step, it is possible to easily obtain the chemical product with a high purity (the chemical product mixed with fewer sulfur fractions). The sulfur fraction of the pyrolysis oil, for example, may be 30000 mass ppm or less, 20000 mass ppm or less, or 10000 mass ppm or less. Accordingly, it is possible to more remarkably reduce the sulfur fraction of the liquid product after the hydrogenolysis step.

That is, the sulfur fraction of the pyrolysis oil, for example, may be 10 to 30000 mass ppm, 10 to 20000 mass ppm, 10 to 10000 mass ppm, 100 to 30000 mass ppm, 100 to 20000 mass ppm, 100 to 10000 mass ppm, 500 to 30000 mass ppm, 500 to 20000 mass ppm, 500 to 10000 mass ppm, 1000 to 30000 mass ppm, 1000 to 20000 mass ppm, or 1000 to 10000 mass ppm.

The chlorine fraction of the pyrolysis oil, for example, may be 10 mass ppm or more, 30 mass ppm or more, 50 mass ppm or more, or 100 mass ppm or more. In this embodiment, even in a case where there are more chlorine fractions in the pyrolysis oil, the chlorine fraction is inverted to a gas component such as hydrogen chloride by the hydrogenaration in the hydrogenolysis step, and can be easily separated from the liquid product. Then, by supplying the liquid product in which the chlorine fraction is considerably reduced to the steam-cracking step, it is possible to easily obtain the chemical product with a high purity (the chemical product mixed with fewer chlorine fractions). The chlorine fraction of the pyrolysis oil, for example, may be 2000 mass ppm or less, 1500 mass ppm or less, or 1000 mass ppm or less. In a case where the chlorine fraction is 1000 mass ppm or less, it is possible to more remarkably reduce the chlorine fraction of the liquid product after the hydrogenolysis step. In addition, not only the chlorine fraction but also other halogen element fractions may be in the same range.

That is, the chlorine fraction of the pyrolysis oil, for example, may be 10 to 2000 mass ppm, 10 to 1500 mass ppm, 10 to 1000 mass ppm, 30 to 2000 mass ppm, 30 to 1500 mass ppm, 30 to 1000 mass ppm, 50 to 2000 mass ppm, 50 to 1500 mass ppm, 50 to 1000 mass ppm, 100 to 2000 mass ppm, 100 to 1500 mass ppm, or 100 to 1000 mass ppm.

The residual fraction, for example, may be a solid fraction that is not recovered as the pyrolysis gas, among the products produced by the pyrolysis. A method for recovering the residual fraction is not particularly limited. The residual fraction, for example, can be recovered as a solid fraction remaining in the pyrolytic furnace (a solid fraction that is not discharged as the pyrolysis gas from a reaction system).

The residual fraction may be a carbide formed by the pyrolysis of the crushed material of the waste tires. In the embodiment, the residual fraction can be recovered as the carbide (the carbide recovery step).

The carbide is a component of which a great part is occupied by carbon. The carbide, for example, may be a carbon concentrate containing carbon black as a main component. The carbide may have a lumpy part aggregated in the process of the pyrolysis. In this case, the powdered carbide is obtained by pulverizing the aggregated carbide using a crusher or the like.

That is, the carbide recovery step of the method of this embodiment may be a step of pulverizing the residual fraction to obtain the powdered carbide.

The powdered carbide, for example, can be preferably used as the rubber additive, the resin additive, the colorant, and the like.

Note that, the residual fraction, for example, may contain a rubber component of the waste material that has not been completely pyrolyzed, in accordance with the pyrolysis condition. In this case, since the rubber component has adherence properties, the carbide is recovered as a lump in which the carbon black and the rubber component are mixed. Since the adherence properties of the rubber component block the powderization of the carbide, it is difficult to powderize the carbide using a pulverizer or the like. Then, since the lumpy carbide leads to a poor dispersion in a base material, it is difficult to use the lumpy carbide as the rubber additive, the resin additive, the colorant, and the like. In contrast, in the pyrolysis step of this embodiment, by adopting the pyrolysis condition described above, the residual rubber component in the recovered carbide decreases, and it is possible to efficiently obtain the powdered carbide preferably used as the rubber additive, the resin additive, the colorant, and the like.

The pyrolysis step, for example, may be implemented by a pyrolyzer including a pyrolytic furnace. FIG. 1 is a schematic view illustrating an example of the pyrolyzer.

The pyrolyzer of FIG. 1 includes a heat exchanger 1 for heating the oxygen-free gas, a decomposer 7 including a pyrolytic furnace 2 accommodating a waste material 6 inside and an outside heater 8 heating the pyrolytic furnace 2 from the outside, an oil fraction recovery apparatus 5 for recovering the oil fraction (the pyrolysis oil) condensed by cooling the pyrolysis gas generated by the decomposer 7, a circulation route 4 for supplying the residual gas after recovering the oil fraction by the oil fraction recovery apparatus 5 as the oxygen-free gas to the heat exchanger 1, and an oxygen-free gas supply source 3 for supplying the oxygen-free gas to the heat exchanger 1.

In addition, the pyrolyzer of FIG. 1 includes a flowmeter 9, a damper 10, and an air blower 11 in a pipe connecting the oxygen-free gas supply source 3 and the heat exchanger 1 in order to supply the oxygen-free gas from the oxygen-free gas supply source 3, and includes a flowmeter 9, a damper 10, an air blower 11, and an air-heating furnace 14 in the circulation route 4 for circulating the residual gas after being recovered by the oil fraction recovery apparatus 5 as the oxygen-free gas to the heat exchanger 1.

In addition, since the oil fraction recovery apparatus 5 may include a plurality of dry distillation towers 12*a* and 12*b* to separate the recovered oil fraction in accordance with the boiling point thereof. Each of the dry distillation towers 12 may be connected to a recovery tank 13 through the pipe at the bottom, and the recovered oil fraction can be stored. Note that, the pyrolyzer of FIG. 1 includes the plurality of dry distillation towers 12*a* and 12*b*, but in this embodiment, since the pyrolysis oil can be directly used for the raw material oil of the hydrogenolysis step, there may be one dry distillation tower. In addition, in the pyrolyzer of FIG. 1, the dry distillation towers 12 are connected to different recovery tanks 13, respectively, but each of the dry distillation towers 12 may be connected to the same recovery tank 13.

(Hydrogenolysis Step)

The hydrogenolysis step is a step of obtaining the second gas fraction, the light fraction with a boiling point of 350° C. or lower, and the heavy fraction with a boiling point higher than 350° C. by the hydrogenolysis of the raw material oil containing at least a part of the pyrolysis oil.

The raw material oil in the hydrogenolysis step may contain the pyrolysis oil, or may contain a part of a distillate obtained by the fractional distillation of the pyrolysis oil. In addition, the raw material oil in the hydrogenolysis step may further contain a component other than the pyrolysis oil, or the pyrolysis oil may be directly used as the raw material oil.

The raw material oil in the hydrogenolysis step contains the low-boiling-point raw material with a boiling point of 350° C. or lower and the high-boiling-point raw material with a boiling point higher than 350° C., and the content of the high-boiling-point raw material, for example, is 15% by mass or more on the basis of the total amount of the raw material oil. By adjusting a decomposition condition in the hydrogenolysis step, the high-boiling-point raw material can be the light fraction. In the steam-cracking step described below, the light fraction is a substance supplied as the raw material for producing the chemical product. Therefore, in a case where the content of the high-boiling-point raw material is 15% by mass or more on the basis of the total amount of the raw material oil, there is a tendency that the raw material oil is more suitable as a raw material oil, and the yield of the chemical product is further improved. According to such a raw material oil, the chemical product can be efficiently obtained, and the heavy distillate obtained in the steam-cracking step is suitable as the raw material for producing a carbide.

The content of the high-boiling-point raw material in the raw material oil, from the viewpoint of further improving the yield of the chemical product and from the viewpoint of making the heavy distillate obtained in the steam-cracking step more suitable as the raw material for producing a carbide, is preferably 20% by mass or more, and may be 25% by mass or more, 30% by mass or more, or 35% by mass or more, on the basis of the total amount of the raw material oil.

The content of the high-boiling-point raw material in the raw material oil, for example, may be 70% by mass or less, 65% by mass or less, 60% by mass or less, 55% by mass or less, or 50% by mass or less, on the basis of the total amount of the raw material oil.

That is, the content of the high-boiling-point raw material in the raw material oil, for example, may be 15 to 70% by mass, 15 to 65% by mass, 15 to 60% by mass, 15 to 55% by mass, 15 to 50% by mass, 20 to 70% by mass, 20 to 65% by mass, 20 to 60% by mass, 20 to 55% by mass, 20 to 50% by mass, 25 to 70% by mass, 25 to 65% by mass, 25 to 60% by mass, 25 to 55% by mass, 25 to 50% by mass, 30 to 70% by mass, 30 to 65% by mass, 30 to 60% by mass, 30 to 55% by mass, 30 to 50% by mass, 35 to 70% by mass, 35 to 65% by mass, 35 to 60% by mass, 35 to 55% by mass, or 35 to 50% by mass, on the basis of the total amount of the raw material oil.

The 10% distillation temperature of the raw material oil, for example, may be 90° C. or higher, and is preferably 140° C. or higher, more preferably 150° C. or higher, and even more preferably 155° C. or higher. In addition, the 10% distillation temperature of the raw material oil, for example, may be 200° C. or lower, 190° C. or lower, or 180° C. or lower.

That is, the 10% distillation temperature of the raw material oil, for example, may be 90 to 200° C., 90 to 190°

C., 90 to 180° C., 140 to 200° C., 140 to 190° C., 140 to 180° C., 150 to 200° C., 150 to 190° C., 150 to 180° C., 155 to 200° C., 155 to 190° C., or 155 to 180° C.

The 90% distillation temperature of the raw material oil, for example, may be 350° C. or higher, and is preferably 370° C. or higher, more preferably 390° C. or higher, and even more preferably 400° C. or higher, and may be 410° C. or higher, 420° C. or higher, 430° C. or higher, 440° C. or higher, or 450° C. or higher. In addition, the 90% distillation temperature of the raw material oil, for example, may be 650° C. or lower, and may be preferably 600° C. or lower, and more preferably 550° C. or lower.

That is, the 90% distillation temperature of the raw material oil, for example, may be 350 to 650° C., 350 to 600° C., 350 to 550° C., 370 to 650° C., 370 to 600° C., 370 to 550° C., 390 to 650° C., 390 to 600° C., 390 to 550° C., 400 to 650° C., 400 to 600° C., 400 to 550° C., 410 to 650° C., 410 to 600° C., 410 to 550° C., 420 to 650° C., 420 to 600° C., 420 to 550° C., 430 to 650° C., 430 to 600° C., 430 to 550° C., 440 to 650° C., 440 to 600° C., 440 to 550° C., 450 to 650° C., 450 to 600° C., or 450 to 550° C.

The raw material oil may contain a nitrogen fraction, a sulfur fraction, a chlorine fraction, other halogen elements, and the like.

The nitrogen fraction of the raw material oil, for example, may be 100 mass ppm or more, 2000 mass ppm or more, 2500 mass ppm or more, or 3000 mass ppm or more. In this embodiment, since the chemical product is produced via the hydrogenolysis step and the cracking step, even in a case where there are more nitrogen fractions in the raw material oil, it is possible to easily obtain the chemical product with a high purity (the chemical product mixed with fewer nitrogen fractions). The nitrogen fraction of the raw material oil, for example, may be 20000 mass ppm or less, 15000 mass ppm or less, or 10000 mass ppm or less.

That is, the nitrogen fraction of the raw material oil, for example, may be 100 to 20000 mass ppm, 100 to 15000 mass ppm, 100 to 10000 mass ppm, 2000 to 20000 mass ppm, 2000 to 15000 mass ppm, 2000 to 10000 mass ppm, 2500 to 20000 mass ppm, 2500 to 15000 mass ppm, 2500 to 10000 mass ppm, 3000 to 20000 mass ppm, 3000 to 15000 mass ppm, or 3000 to 10000 mass ppm.

The sulfur fraction of the raw material oil, for example, may be 10 mass ppm or more, 100 mass ppm or more, 500 mass ppm or more, or 1000 mass ppm or more. In this embodiment, since the chemical product is produced via the hydrogenolysis step and the cracking step, even in a case where there are more sulfur fractions in the raw material oil, it is possible to easily obtain the chemical product with a high purity (the chemical product mixed with fewer sulfur fractions). The sulfur fraction of the raw material oil, for example, may be 30000 mass ppm or less, 20000 mass ppm or less, or 10000 mass ppm or less.

That is, the sulfur fraction of the raw material oil, for example, may be 10 to 30000 mass ppm, 10 to 20000 mass ppm, 10 to 10000 mass ppm, 100 to 30000 mass ppm, 100 to 20000 mass ppm, 100 to 10000 mass ppm, 500 to 30000 mass ppm, 500 to 20000 mass ppm, 500 to 10000 mass ppm, 1000 to 30000 mass ppm, 1000 to 20000 mass ppm, or 1000 to 10000 mass ppm.

The chlorine fraction of the raw material oil, for example, may be 10 mass ppm or more, 30 mass ppm or more, 50 mass ppm or more, or 100 mass ppm or more. In this embodiment, since the chemical product is produced via the hydrogenolysis step and the cracking step, even in a case where there are more chlorine fractions in the raw material oil, it is possible to easily obtain the chemical product with a high purity (the chemical product mixed with fewer chlorine fractions). The chlorine fraction of the raw material oil, for example, may be 2000 mass ppm or less, 1500 mass ppm or less, or 1000 mass ppm or less. In addition, not only the chlorine fraction but also other halogen element fractions may be in the same range.

That is, the chlorine fraction of the raw material oil, for example, may be 10 to 2000 mass ppm, 10 to 1500 mass ppm, 10 to 1000 mass ppm, 30 to 2000 mass ppm, 30 to 1500 mass ppm, 30 to 1000 mass ppm, 50 to 2000 mass ppm, 50 to 1500 mass ppm, 50 to 1000 mass ppm, 100 to 2000 mass ppm, 100 to 1500 mass ppm, or 100 to 1000 mass ppm.

The hydrogenolysis step may be a step of hydrogenolyzing the raw material oil in the presence of a hydrogenolysis catalyst. The hydrogenolysis, for example, can be implemented by supplying the raw material oil to a reactor in which the hydrogenolysis catalyst is disposed and bringing the raw material oil into contact with the hydrogenolysis catalyst in the reactor.

As the hydrogenolysis catalyst, for example, a known hydrogenolysis catalyst used in the hydrogenolysis of a hydrocarbon oil can be used.

In this embodiment, the raw material oil contains a predetermined amount or more of the high-boiling-point raw material. Therefore, as the hydrogenolysis catalyst, a catalyst that has excellent hydrogenaration ability and is capable of efficiently hydrogenolyzing the high-boiling-point raw material is preferable. From the viewpoint of the hydrogenaration ability, it is preferable that the hydrogenolysis catalyst, for example, includes a Ni-based catalyst. The Ni-based catalyst is a catalyst having Ni as an active metal.

The hydrogenolysis step may be implemented using one type of hydrogenolysis catalyst, or may be implemented using a plurality of types of hydrogenolysis catalysts. For example, in the hydrogenolysis step, as the hydrogenolysis catalyst, a desulfurization/denitrogenation catalyst, a high-decomposition catalyst, a low-decomposition catalyst, and the like, described below, can be suitably used in combination.

The desulfurization/denitrogenation catalyst may be a hydrogenolysis catalyst excellent in desulfurization ability and denitrogenation ability. Examples of the desulfurization/denitrogenation catalyst include a hydrogenolysis catalyst obtained by supporting an active metal on a carrier containing alumina. There is a tendency that such a hydrogenolysis catalyst is excellent in the desulfurization ability and the denitrogenation ability.

The carrier of the desulfurization/denitrogenation catalyst may be a carrier containing alumina, and the content of the alumina is preferably 50% by mass or more. The content of the alumina in the carrier of the desulfurization/denitrogenation catalyst, for example, may be 50% by mass or more, and is preferably 55% by mass or more, and more preferably 60% by mass or more, on the basis of the total amount of the carrier.

The carrier of the desulfurization/denitrogenation catalyst may contain a component other than alumina. The carrier of the desulfurization/denitrogenation catalyst, for example, may contain an oxide of an element of Group 2, Group 3, Group 4, Group 13, Group 14, or Group 15 in the periodic table. More specifically, the carrier of the desulfurization/denitrogenation catalyst, for example, may contain at least one type of oxides such as silica, phosphorus, magnesia, zirconia, boria, titania, calcia, and zinc. From the viewpoint of desulfurization/denitrogenation ability, industrial production, and catalyst strength, it is preferable that the carrier of the desulfurization/denitrogenation catalyst contains silica, silica-alumina, silica-alumina-phosphorus, silica-magnesia, alumina-silica-magnesia, alumina-silica-zirconia, and the like. Note that, the carrier of the desulfurization/denitrogenation catalyst may have crystallizability, or may be in an amorphous state. The shape of the carrier of the desulfurization/denitrogenation catalyst is not particularly limited, and for example, may be a spherical shape, a cylindrical shape, a three-leaf shape, a four-leaf shape, or the like.

Examples of the active metal contained in the desulfurization/denitrogenation catalyst include Ni, Mo, Co, W, P, and the like. The desulfurization/denitrogenation catalyst may have one type of active metal, or may have two or more types of active metals. The desulfurization/denitrogenation catalyst, from the viewpoint of easily attaining excellent hydrogenaration ability and more efficiently enabling the desulfurization/denitrogenation, contains preferably at least Ni, and more preferably Ni and Mo or W. The active metal may be activated by a sulfidation treatment. In particular, by containing a sulfide of Ni among the metals, the desulfurization/denitrogenation catalyst more easily attains excellent hydrogenaration ability.

Examples of the high-decomposition catalyst include a hydrogenolysis catalyst obtained by supporting an active metal on a carrier containing zeolite. There is a tendency that such a hydrogenolysis catalyst may have fine pores and is excellent in hydrogenolysis ability.

The carrier of the high-decomposition catalyst may be a carrier containing zeolite, and the content of the zeolite is preferably 1% by mass or more. The content of the zeolite in the carrier of the high-decomposition catalyst, for example, may be 2% by mass or more, and is preferably 3% by mass or more, and more preferably 5% by mass or more, on the basis of the total amount of the carrier.

The carrier of the high-decomposition catalyst may contain a component other than zeolite. The carrier of the high-decomposition catalyst, for example, may contain an oxide of an element of Group 2, Group 3, Group 4, Group 13, Group 14, or Group 15 in the periodic table. More specifically, the carrier of the high-decomposition catalyst, for example, may contain at least one type of oxides such as silica, alumina, phosphorus, magnesia, zirconia, boria, titania, calcia, and zinc. From the viewpoint of decomposition ability, the desulfurization/denitrogenation ability, the industrial production, and the catalyst strength, it is preferable that the carrier of the high-decomposition catalyst contains alumina, silica, silica-alumina, silica-alumina-phosphorus, silica-magnesia, alumina-silica-magnesia, alumina-silica-zirconia, and the like. Note that, the carrier of the high-decomposition catalyst may have crystallizability, or may be in an amorphous state. The shape of the carrier of the high-decomposition catalyst is not particularly limited, and for example, may be a spherical shape, a cylindrical shape, a three-leaf shape, a four-leaf shape, or the like.

Examples of the active metal contained in the high-decomposition catalyst include Ni, Mo, Co, W, P, and the like. The high-decomposition catalyst may have one type of active metal, or may have two or more types of active metals. The high-decomposition catalyst, from the viewpoint of easily attaining excellent hydrogenaration ability and more efficiently enabling the hydrogenolysis of the high-boiling-point raw material, contains preferably at least Ni, and more preferably Ni and Mo or W. The active metal may be activated by a sulfidation treatment. In particular, by containing a sulfide of Ni among the metals, the desulfurization/denitrogenation catalyst more easily attains excellent hydrogenaration ability.

Examples of the low-decomposition catalyst include a hydrogenolysis catalyst obtained by supporting an active metal on a carrier containing alumina. There is a tendency that such a hydrogenolysis catalyst may have more fine pores larger than those of the high-decomposition catalyst and have hydrogenolysis ability milder than that of the high-decomposition catalyst.

The carrier of the low-decomposition catalyst may be a carrier containing alumina. The content of the alumina in the carrier of the low-decomposition catalyst, for example, may be 20% by mass or more, and is preferably 25% by mass or more, and more preferably 30% by mass or more, on the basis of the total amount of the carrier.

The carrier of the low-decomposition catalyst may contain a component other than alumina. The carrier of the low-decomposition catalyst, for example, may contain an oxide of an element of Group 2, Group 3, Group 4, Group 13, Group 14, or Group 15 in the periodic table. More specifically, the carrier of the low-decomposition catalyst, for example, may contain at least one type of oxides such as silica, phosphorus, magnesia, zirconia, boria, titania, calcia, and zinc. From the viewpoint of the decomposition ability, the desulfurization/denitrogenation ability, the industrial production, and the catalyst strength, it is preferable that the carrier of the low-decomposition catalyst contains silica, silica-alumina, silica-alumina-phosphorus, silica-magnesia, alumina-silica-magnesia, alumina-silica-zirconia, and the like. Note that, the carrier of the low-decomposition catalyst may have crystallizability, or may be in an amorphous state. The shape of the carrier of the low-decomposition catalyst is not particularly limited, and for example, may be a spherical shape, a cylindrical shape, a three-leaf shape, a four-leaf shape, or the like.

Examples of the active metal contained in the low-decomposition catalyst include Ni, Mo, Co, W, P, and the like. The low-decomposition catalyst may have one type of active metal, or may have two or more types of active metals. The low-decomposition catalyst, from the viewpoint of more efficiently enabling the hydrogenolysis of the high-boiling-point raw material, contains preferably at least Ni, and more preferably Ni and Mo or W. The active metal may be activated by a sulfidation treatment. In particular, by containing a sulfide of Ni among the metals, the desulfurization/denitrogenation catalyst more easily attains excellent hydrogenaration ability.

In the hydrogenolysis step, the desulfurization/denitrogenation catalyst and the decomposition catalyst may be used in combination. As the decomposition catalyst, the high-decomposition catalyst and the low-decomposition catalyst may be used in combination, only the high-decomposition catalyst may be used, or only the low-decomposition catalyst may be used. In addition, the desulfurization/denitrogenation catalyst may be disposed at least prior to the high-decomposition catalyst and the low-decomposition catalyst, or may be disposed prior to and posterior to the high-decomposition catalyst and the low-decomposition catalyst.

In a case where the pyrolysis oil contains the nitrogen fraction, there is a possibility that the nitrogen fraction in the pyrolysis oil is attached to the active point of the high-decomposition catalyst or the low-decomposition catalyst, and decreases the decomposition ability of the high-decomposition catalyst or the low-decomposition catalyst. In a case where the pyrolysis oil is in contact with the desulfurization/denitrogenation catalyst, the nitrogen fraction contained in the pyrolysis oil is inverted to ammonia or the like, and the nitrogen fraction contained in the pyrolysis oil is reduced.

Accordingly, in the hydrogenolysis step, it preferable is that the desulfurization/denitrogenation catalyst is disposed prior to the high-decomposition catalyst or the low-decomposition catalyst. That is, it is preferable that the desulfurization/denitrogenation catalyst is disposed prior to a hydrogenolysis unit described below. According to such disposition, even in a case where the nitrogen fraction is contained in the pyrolysis oil, it is possible to suppress a decrease in the decomposition ability of the high-decomposition catalyst or the low-decomposition catalyst.

The hydrogenolysis step, for example, may be implemented using a flow reactor. In this case, it is preferable that a first catalyst layer containing the desulfurization/denitrogenation catalyst and a second catalyst layer containing the decomposition catalyst are disposed in this order from the inlet side in the flow reactor. In addition, a third catalyst layer containing different types of decomposition catalysts with different decomposition ability and a fourth catalyst layer containing the desulfurization/denitrogenation catalyst may be further disposed posterior to the second catalyst layer.

A reaction temperature in the hydrogenolysis step is not particularly limited, and for example, may be 300° C. or higher, and is preferably 320° C. or higher, and more preferably 340° C. or higher. In addition, the reaction temperature in the hydrogenolysis step, for example, may be 480° C. or lower, and is preferably 460° C. or lower, and more preferably 440° C. or lower.

That is, the reaction temperature in the hydrogenolysis step, for example, may be 300 to 480° C., 300 to 460° C., 300 to 440° C., 320 to 480° C., 320 to 460° C., 320 to 440° C., 340 to 480° C., 340 to 460° C., or 340 to 440° C.

A reaction pressure in the hydrogenolysis step is not particularly limited, and for example, may be 1 MPaG or more, and is preferably 3 MPaG or more, and more preferably 5 MPaG or more. In addition, the reaction pressure in the hydrogenolysis step is not particularly limited, and for example, may be 20 MPaG or less, and is preferably 19 MPaG or less, and more preferably 18 MPaG or less.

That is, the reaction pressure in the hydrogenolysis step, for example, may be 1 to 20 MPaG, 1 to 19 MPaG, 1 to 18 MPaG, 3 to 20 MPaG, 3 to 19 MPaG, 3 to 18 MPaG, 5 to 20 MPaG, 5 to 19 MPaG, or 5 to 18 MPaG.

In a case where the hydrogenolysis step is implemented using the flow reactor, the weight hourly space velocity (WHSV) of the raw material oil, for example, may be 0.1 h$^{-1}$ or more, and is preferably 0.15 h$^{-1}$ or more, and more preferably 0.2 h$^{-1}$ or more. In addition, the weight hourly space velocity (WHSV) of the raw material oil, for example, may be 5 h$^{-1}$ or less, and is preferably 4 h$^{-1}$ or less, and more preferably 3 h$^{-1}$ or less.

That is, the weight hourly space velocity (WHSV) of the raw material oil may be 0.1 to 5 h$^{-1}$, 0.1 to 4 h$^{-1}$, 0.1 to 3 h$^{-1}$, 0.15 to 5 h$^{-1}$, 0.15 to 4 h$^{-1}$, 0.15 to 3 h$^{-1}$, 0.2 to 5 h$^{-1}$, 0.2 to 4 h$^{-1}$, or 0.2 to 3 h$^{-1}$.

The hydrogenolysis step is implemented in the presence of hydrogen. In a case where the hydrogenolysis step is implemented using the flow reactor, a hydrogen/oil ratio, for example, may be 100 NL/L or more, and is preferably 150 NL/L or more, and more preferably 200 NL/L or more. In addition, the hydrogen/oil ratio, for example, may be 1500 NL/L or less, and is preferably 1400 NL/L or less, and more preferably 1300 NL/L or less.

That is, the hydrogen/oil ratio, for example, may be 100 to 1500 NL/L, 100 to 1400 NL/L, 100 to 1300 NL/L, 150 to 1500 NL/L, 150 to 1400 NL/L, 150 to 1300 NL/L, 200 to 1500 NL/L, 200 to 1400 NL/L, or 200 to 1300 NL/L.

In the hydrogenolysis step, the second gas fraction, the light fraction with a boiling point of 350° C. or lower, and the heavy fraction with a boiling point higher than 350° C. are obtained by the hydrogenolysis of the raw material oil.

The second gas fraction, for example, may be a component that is a gas at ordinary temperature and 20° C., among the products produced by the hydrogenolysis. The second gas fraction, for example, may contain hydrogen, hydrocarbon having 1 to 4 carbon atoms, or the like.

The second gas fraction, for example, may be used as the combustion gas for heating the pyrolysis part in the pyrolysis step, the combustion gas for the heating furnace in the other steps, or the like.

The light fraction, for example, may be a hydrocarbon oil with a boiling point of 350° C. or lower, among the products produced by the hydrogenolysis. The light fraction is provided to the steam-cracking step.

The sulfur fraction in the light fraction, for example, is 1500 mass ppm or less, and from the viewpoint of reducing the amount of impurities in the chemical product obtained in the cracking step and preventing the poisoning of the catalyst or the corrosion of the apparatus in the latter stage of the cracking step, is preferably 1000 mass ppm or less, and more preferably 900 mass ppm or less.

The nitrogen fraction in the light fraction, for example, is 25 mass ppm or less, and from the viewpoint of reducing the amount of the impurities in the chemical product obtained in the cracking step and preventing the poisoning of the catalyst or the corrosion of the apparatus in the latter stage of the cracking step, is preferably 20 mass ppm or less, and more preferably 15 mass ppm or less.

The chlorine fraction in the light fraction, for example, is 20 mass ppm or less, and from the viewpoint of reducing the amount of the impurities in the chemical product obtained in the cracking step and preventing the poisoning of the catalyst or the corrosion of the apparatus in the latter stage of the cracking step, is preferably 15 mass ppm or less, and more preferably 10 mass ppm or less. In addition, it is preferable that not only the chlorine fraction but also other halogen element fractions are in the same range.

The heavy fraction, for example, may be a hydrocarbon oil with a boiling point higher than 350° C., among the products produced by the hydrogenolysis.

The heavy fraction, for example, may be reused as a part or all of the raw material oil of the hydrogenolysis step. In addition, the heavy fraction, for example, may be used for a combustion oil for heating the pyrolysis part in the pyrolysis step, a combustion oil for the heating furnace in the other steps, or the like.

(Steam-Cracking Step)

The steam-cracking step is a step of obtaining the chemical product, and the raw material for producing a carbide consisting of the heavy distillate with a 10% distillation temperature of 190° C. or higher by the steam cracking of the steam-cracking raw material oil containing a part of the light fraction obtained in the hydrogenolysis step. In the steam-cracking step, by performing a heat treatment on the steam-cracking raw material oil with steam, the light fraction or the like is decomposed, and a component useful as the chemical product is produced. In addition, the heavy distillate with a 10% distillation temperature of 190° C. or higher, which is obtained in the steam-cracking step, is preferably used as the raw material for producing a carbide.

In the steam-cracking step, a part of the light fraction obtained in the hydrogenolysis step may be provided to the steam cracking, or all of the light fraction may be provided to the steam cracking. In addition, the steam-cracking raw material oil in the steam-cracking step may further contain ethane, naphtha, kerosene, and a light petroleum distillate, which are derived from petroleum or the like, in addition to the light fraction. In the steam-cracking step, the light fraction may be directly used as the steam-cracking raw material oil.

A steam-cracking condition is not particularly limited, and may be suitably selected from known conditions adopted in the steam cracking of ethane, naphtha, kerosene, light petroleum, or the like.

A reaction temperature in the steam cracking, for example, may be 650° C. or higher, and is preferably 700° C. or higher, and more preferably 750° C. or higher. In addition, the reaction temperature in the steam cracking, for example, may be 1000° C. or lower, and is preferably 950° C. or lower, and more preferably 900° C. or lower.

That is, the reaction temperature in the steam cracking, for example, may be 650 to 1000° C., 650 to 950° C., 650 to 900° C., 700 to 1000° C., 700 to 950° C., 700 to 900° C., 750 to 1000° C., 750 to 950° C., or 750 to 900° C.

A reaction time (a residence time) in the steam cracking, for example, may be 0.05 seconds or longer, and is preferably 0.06 seconds or longer, and more preferably 0.08 seconds or longer. In addition, the reaction time in the steam cracking, for example, may be 2.0 seconds or shorter, and is preferably 1.9 seconds or shorter, and more preferably 1.8 seconds or shorter.

That is, the reaction time in the steam cracking, for example, may be 0.05 to 2.0 seconds, 0.05 to 1.9 seconds, 0.05 to 1.8 seconds, 0.06 to 2.0 seconds, 0.06 to 1.9 seconds, 0.06 to 1.8 seconds, 0.08 to 2.0 seconds, 0.08 to 1.9 seconds, or 0.08 to 1.8 seconds.

A ratio (a mass ratio) of steam/steam-cracking raw material oil in the steam cracking, for example, may be 0.2 or more, and is preferably 0.25 or more, and more preferably 0.3 or more. In addition, the ratio (the mass ratio) of steam/steam-cracking raw material oil, for example, may be 1.0 or less, and is preferably 0.9 or less, and more preferably 0.8 or less.

That is, the ratio (the mass ratio) of steam/steam-cracking raw material oil, for example, may be 0.2 to 1.0, 0.2 to 0.9, 0.2 to 0.8, 0.25 to 1.0, 0.25 to 0.9, 0.25 to 0.8, 0.3 to 1.0, 0.3 to 0.9, or 0.3 to 0.8.

An outlet reaction pressure in the steam cracking, for example, may be 0.1 MPaA or more, and is preferably 0.15 MPaA or more, and more preferably 0.20 MPaA or more. In addition, the reaction pressure in the steam cracking, for example, may be 1.0 MPaA or less, and is preferably 0.8 MPaA or less, and more preferably 0.6 MPaA or less.

That is, the outlet reaction pressure in the steam cracking, for example, may be 0.1 to 1.0 MPaA, 0.1 to 0.8 MPaA, 0.1 to 0.6 MPaA, 0.15 to 1.0 MPaA, 0.15 to 0.8 MPaA, 0.15 to 0.6 MPaA, 0.2 to 1.0 MPaA, 0.2 to 0.8 MPaA, or 0.2 to 0.6 MPaA.

Examples of the chemical product obtained in the steam-cracking step include ethylene, propylene, butadiene, butenes, isoprene, benzene, toluene, xylene, ethyl benzene, styrene, cyclopentadiene, dicyclopentadiene, olefin-containing aromatic series having C9 for resin conversion, such as indene or methyl styrene, and the like.

In the steam-cracking step, a light distillate may be further obtained in addition to the chemical product. Examples of the light distillate include methane, ethane, propane, butanes, pentane, hexane, and the like.

In the steam-cracking step, a heavy distillate may be further obtained in addition to the chemical product. The heavy distillate obtained in the steam-cracking step of this embodiment tends to contain more aromatic fractions, and can be preferably used as the raw material for producing the carbide (in particular, the carbon black).

The 10% distillation temperature of the heavy distillate, for example, is 190° C. or higher, and may be 200° C. or higher. The 10% distillation temperature of the heavy distillate, for example, may be 250° C. or lower, or 240° C. or lower. The 90% distillation temperature of the heavy distillate, for example, may be 450° C. or higher, or 500° C. or higher. The 90% distillation temperature of the heavy distillate, for example, may be 750° C. or lower, or 700° C. or lower.

That is, the 10% distillation temperature of the heavy distillate, for example, may be 190 to 250° C., 190 to 240° C., 200 to 250° C., or 200 to 240° C. In addition, the 90% distillation temperature of the heavy distillate, for example, may be 450 to 750° C., 450 to 700° C., 500 to 750° C., or 500 to 700° C.

The aromatic fraction of the heavy distillate, for example, may be 30% by mass or more, and is preferably 35% by mass or more, and more preferably 40% by mass or more. In addition, the aromatic fraction of the heavy distillate, for example, may be 90% by mass or less.

That is, the aromatic fraction of the heavy distillate, for example, may be 30 to 90% by mass, 35 to 90% by mass, or 40 to 90% by mass.

The steam-cracking step, for example, may be implemented by a steam-cracking apparatus including a reactor.
(Carbide Production Step)

The method of this embodiment may further include a carbide production step of obtaining a carbide by the pyrolysis or the incomplete combustion of the raw material for producing a carbide.

Since the raw material for producing a carbide obtained in the steam-cracking step contains more aromatic fractions, there is a tendency that the carbide (in particular, the carbon black) excellent in a production volume is easily obtained.

The pyrolysis or the incomplete combustion in the carbide production step, for example, can be implemented by a method for spray-introducing the heavy distillate obtained in the steam-cracking step to a combustion reaction vessel containing high-temperature oxygen, and then, performing rapid cooling with water or the like, using a soft carbon black production apparatus disclosed in Japanese Unexamined Patent Publication No. S61-34071 (Applicant: ASAHI CARBON CO., LTD.). Note that, the incomplete combustion can be combustion under a low-oxygen-concentration atmosphere. The low oxygen concentration is a concentration lower than an oxygen concentration in the atmosphere (approximately 21% by volume).

The temperature of the pyrolysis or the incomplete combustion in the carbide production step is not particularly limited, and for example, may be 1200° C. or higher, 1300° C. or higher, 1400° C. or higher, or 1500° C. or higher. In addition, the temperature of the pyrolysis or the incomplete combustion in the carbide production step, for example, may be 1900° C. or lower, 1800° C. or lower, 1700° C. or lower, or 1600° C. or lower.

That is, the temperature of the pyrolysis or the incomplete combustion in the carbide production step, for example, may be 1200 to 1900° C., 1200 to 1800° C., 1200 to 1700° C., 1200 to 1600° C., 1300 to 1900° C., 1300 to 1800° C., 1300 to 1700° C., 1300 to 1600° C., 1400 to 1900° C., 1400 to 1800° C., 1400 to 1700° C., 1400 to 1600° C., 1500 to 1900° C., 1500 to 1800° C., 1500 to 1700° C., or 1500 to 1600° C.

The carbide obtained in the carbide production step, for example, is carbon black.

Figure 2:
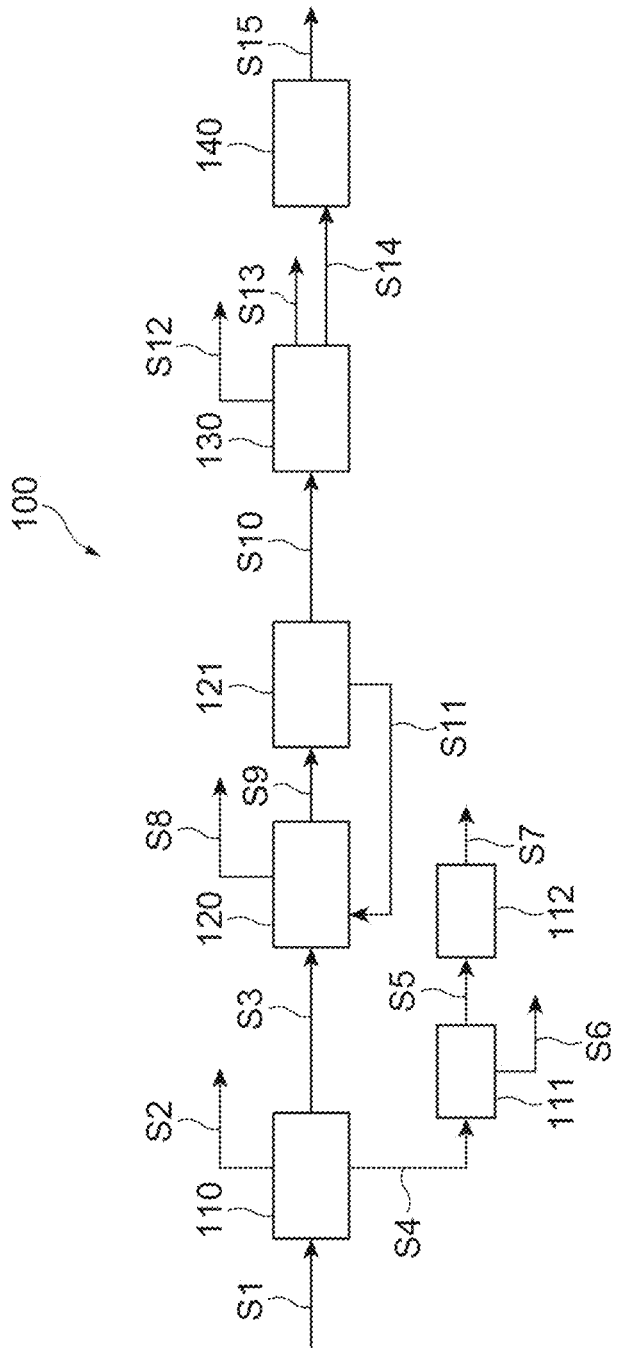
FIG. 2 is a schematic view illustrating an example of a system implementing a method for producing chemical products and carbides.

FIG. 2 is a schematic view illustrating an example of a system implementing the method of this embodiment. A system 100 illustrated in FIG. 2 includes a pyrolysis unit 110, a first separation unit 111, a fragmentation unit 112, a hydrogenolysis unit 120, a second separation unit 121, a steam cracker 130, and a carbide production unit 140.

In the system 100, first, a waste material S1 is supplied to the pyrolysis unit 110, and the waste material S1 is pyrolyzed by the pyrolysis unit 110. In the pyrolysis unit 110, a first gas fraction S2, a pyrolysis oil S3, and a mixture S4 of a residual fraction and a metal fraction are produced. The first gas fraction S2 may be discharged from the system, or may be reused as the oxygen-free gas in the pyrolysis unit 110. The pyrolysis oil S3 is supplied to the hydrogenolysis unit 120. The mixture S4 is supplied to the first separation unit 111, and is separated into a residual fraction S5 and a metal fraction S6 by the first separation unit 111. The residual fraction S5 is fragmented by the fragmentation unit 112, and is recovered as a powdered carbide S7.

In the hydrogenolysis unit 120, a second gas fraction S8 and a hydrogenolysis oil S9 are generated by the hydrogenolysis of the pyrolysis oil S3. The second gas fraction S8 may be discharged from the system, or may be used as the combustion gas for heating the pyrolysis part in the pyrolysis step or the combustion gas for the heating furnace in the other steps. The hydrogenolysis oil S9 is supplied to the second separation unit 121, and is fractionally distilled to a light fraction S10 and a heavy fraction S11 by the second separation unit 121. The light fraction S10 is supplied to the steam cracker 130. The heavy fraction S11 may be recovered as a heavy oil fraction, may be reused in the hydrogenolysis unit 120, or may be used as the combustion oil for heating the pyrolysis part in the pyrolysis step or the combustion oil for the heating furnace in the other steps.

In the steam cracker 130, a produced gas S12, a produced oil S13, and a heavy distillate S14 are formed by the steam cracking of the light fraction S10. The produced gas S12 and the produced oil S13 contain ethylene, propylene, butadiene, butenes, isoprene, benzene, toluene, xylene, ethyl benzene, styrene, cyclopentadiene, dicyclopentadiene, an olefin-containing aromatic fraction having C9 for resin conversion, such as indene or methyl styrene, and the like, which are useful as the chemical product, and the produced gas S12 and the produced oil S13 are suitably separated and recovered to obtain the chemical product. The heavy distillate S14 is supplied to the carbide production unit 140. In the carbide production unit 140, a carbide S15 is formed by the pyrolysis of the heavy distillate S14.

The preferred embodiment of the present invention has been described, but the present invention is not limited to the embodiment described above.

EXAMPLES

Hereinafter, the present invention will be described in more detail by Examples, but the present invention is not limited to such Examples.

In Examples described below, component analysis is performed by the following methods.

Distillation Characteristic: JIS K 2254 (Petroleum Product-Distillation Test Method-Part 7 Gas chromatography).

Nitrogen Fraction: JIS K 2609 (Crude Oil and Petroleum Product-Nitrogen Fraction Test Method)

Chlorine Fraction: JPI-5S-64 (Petroleum Product-Chlorine Fraction Test Method-Microcoulometric Titration Method)

Sulfur Fraction: JIS K 2541-7 (Crude Oil and Petroleum Product-Sulfur Fraction Test Method Part 7: Wavelength Dispersive Fluorescent X-Ray Method (Calibration Curve Method))

Analysis of Gas Produced by Steam Cracking: JIS K 2301:2011 (Fuel Gas and Natural Gas-Analysis/Test Method)

Analysis of Oil Produced by Steam Cracking: an oil produced by steam cracking, which is obtained after oil-water separation, is fractionally distilled to obtain a distillate of 250° C. or lower, and then, analysis is performed by JIS K 2536-2 (Petroleum Product-Component Test Method Part 2: Method for Obtaining All Components by Gas Chromatograph).

Example 1

(1) Pyrolysis Step

A pyrolysis step is performed using the pyrolyzer illustrated in FIG. 1.

Specifically, approximately 100 kg of a cut product (the waste material 6) of a tire for a discarded truck is put in the pyrolytic furnace 2 (a content of 0.5 m³), the inside of the pyrolytic furnace 2 is replaced with nitrogen gas, and then, a gas temperature is increased to 400° C. by the heat exchanger 1 while circulating the nitrogen gas in the pyrolyzer, and the temperature is retained. Note that, the gas flow rate of the nitrogen gas introduced into the pyrolytic furnace 2 is set to 0.005 m³/s [ntp], and is controlled in a range of 0.0045 m³/s [ntp] to 0.0055 m³/s [ntp]. In addition, an oxygen concentration in the system of the pyrolyzer is controlled in a range of 1% by volume or less. Note that, the oxygen concentration in the pyrolyzer is measured using a zirconia oxygen sensor.

A pyrolysis oil is obtained from the bottom of the dry distillation tower 12a. In addition, a first gas fraction is obtained from the top of the dry distillation tower 12a.

Note that, the reaction is performed until the distillation of the pyrolysis oil is stopped, and after the distillation is stopped, the heat exchanger 1 is stopped and left to cool for approximately 12 hours. After that, a mixture of a residual fraction and a metal fraction is taken out from the pyrolytic furnace. The metal fraction is removed from the mixture by a magnet separator to obtain the residual fraction. The residual fraction is pulverized by a hammer pulverizer to a fine powder with a particle diameter of 1 mm or less and classified by a wind-powered classifier having a rotation blade, and a coarse powder with a particle diameter of 50 μm or more is removed to obtain a carbide with a particle diameter of 10 μm or less and a mode of 4 μm. The ratio of each component and the characteristic of the pyrolysis oil are as shown in Table 1.

(2) Hydrogenolysis Step (2-1) Production of Hydrogenaration Catalyst A-1

A cylindrical carrier with a diameter of approximately 1.6 mm and a length of approximately 3 mm is prepared using a silica-alumina powder having a composition of 97% by mass of alumina as an oxide and 3% by mass of silica. Nickel nitrate and ammonium heptamolybdate are dissolved in ion exchange water corresponding to the amount of water absorption of the carrier, which is measured in advance, to obtain an impregnation solution of the nickel nitrate and the ammonium heptamolybdate. The carrier is impregnated with the impregnation solution by an incipient wetness method, and supporting is performed such that a Ni content in terms of oxide is 4% by mass, and a Mo content in terms of oxide is 20% by mass, on the basis of the mass of the carrier. Next, the obtained impregnated product (contact precursor) is dried at 120° C. for 3 hours, and then, calcined at 500° C. for 1 hour in the circulation of the air to obtain a hydrogenaration catalyst A-1.

(2-2) Production of Catalyst B-1

A cylindrical carrier with a diameter of approximately 1.6 mm and a length of approximately 3 mm is prepared by the addition kneading and the calcination of 0.9 kg of a silica-alumina powder of 30% by mass of alumina as an oxide and 70% by mass of silica, and 0.1 kg of USY zeolite of $SiO_2/Al_2O_3$=30. Nickel nitrate and ammonium tungstate are dissolved in ion exchange water corresponding to the amount of water absorption of the carrier, which is measured in advance, to obtain an impregnation solution of the nickel nitrate and the ammonium tungstate. The carrier is impregnated with the impregnation solution by an incipient wetness method, and supporting is performed such that a Ni content in terms of oxide is 10% by mass, and a W content in terms of oxide is 20% by mass, on the basis of the mass of the carrier. Next, the obtained impregnated product (contact precursor) is dried at 120° C. for 3 hours, and then, calcined at 500° C. for 1 hour in the circulation of the air to obtain a hydrogenaration catalyst B-1.

(2-3) Hydrogenolysis

A reaction tube (an inner diameter of 20 mm) is filled with the hydrogenaration catalyst A-1 and the hydrogenolysis catalyst B-1 at a weight ratio of 8:2. As a filling order, the hydrogenaration catalyst A-1 is at the first half of the reaction tube, and the hydrogenaration catalyst B-1 is at the second half of the reaction tube. A sulfidation treatment is performed with an oil in which 1% by weight of carbon bisulfide is dissolved in a light petroleum, and then, hydrogenolysis using the pyrolysis oil as a raw material is performed in the condition of a reaction pressure of 11 MPaG, a reaction temperature of 390° C., and WHSV=0.3 h$^{-1}$, and a second gas fraction and a hydrogenolysis oil are obtained. The hydrogenolysis oil is fractionally distilled into a light fraction and a heavy fraction, and the ratio of each component is obtained. Results are shown in Table 2.

(3) Steam-Cracking Step

The light fraction obtained in the hydrogenolysis step reacts with steam in the condition of a reactor outlet reaction temperature of 790° C., a reaction pressure of 0.15 MPaA, and a reaction tube residence time of 0.25 seconds using a pyrolyzer including a tubular reactor (a reaction tube). Products after the reaction (a produced gas, a produced oil, and a raw material for producing a carbide) are recovered. Results are shown in Table 3. Note that, the 10% distillation temperature of a heavy distillate is adjusted to 190° C. or higher.

Example 2

A chemical product is produced as with Example 1, except that the pyrolysis temperature in the pyrolysis step is changed to 500° C.

Example 3

A chemical product is produced as with Example 1, except that the pyrolysis temperature in the pyrolysis step is changed to 700° C.

Comparative Example 1

A chemical product is produced as with Example 1, except that the pyrolysis temperature in the pyrolysis step is changed to 300° C.

Comparative Example 2

A chemical product is produced as with Example 1, except that the pyrolysis temperature in the pyrolysis step is changed to 800° C.

In Examples 1 to 3 and Comparative Example 2, a powdered carbide, which is suitably used as a rubber additive, a resin additive, a colorant, and the like, is obtained from the residual fraction of the pyrolysis step. On the other hand, in Comparative Example 1, the rubber component remains in the residual fraction, it is difficult to perform powderization, and the powdered carbide is not obtained.

The results of the pyrolysis step, the hydrogenolysis step, and the steam-cracking step in Examples 1 to 3 and Comparative Examples 1 and 2 are shown in Tables 1 to 6. Note that, a chemical product yield (% by mass) with respect to the total amount of a pyrolysis product excluding the metal fraction indicates a ratio of the total amount of the chemical product (ethylene, propylene, butadiene, butenes, isoprene, cyclopentadiene, benzene, toluene, xylene, ethyl benzene, styrene, indene, and methyl styrene) to the total amount of the first gas fraction, the pyrolysis oil, and the residual fraction obtained in the pyrolysis step.

TABLE 1

| Pyrolysis step | | Example 1 | Example 2 | Example 3 |
|---|---|---|---|---|
| Pyrolysis temperature | | 400° C. | 500° C. | 700° C. |
| Ratio of product | First gas fraction (% by mass) | 2 | 15 | 18 |
| | Pyrolysis oil (% by mass) | 59 | 50 | 48 |
| | Residual fraction (% by mass) | 39 | 35 | 34 |
| Characteristic of pyrolysis oil | IBP (° C.) | 92 | 90 | 88 |
| | T10 (° C.) | 163 | 164 | 143 |
| | T50 (° C.) | 334 | 312 | 297 |
| | T70 (° C.) | 407 | 384 | 369 |
| | T90 (° C.) | 500 | 475 | 442 |
| | EBP (° C.) | 620 | 601 | 590 |
| | Nitrogen fraction (mass ppm) | 5600 | 5700 | 5700 |
| | Sulfur fraction (mass ppm) | 8700 | 8950 | 8800 |
| | Chlorine fraction (mass ppm) | 17 | 17 | 17 |
| Yield (% by mass) of powdered carbide | | 39 | 35 | 34 |

TABLE 2

| Hydrogenolysis step | | Example 1 | Example 2 | Example 3 |
|---|---|---|---|---|
| Characteristic of raw material oil | High-boiling-point raw material (% by mass) | 46 | 39 | 35 |
| | Low-boiling-point raw material (% by mass) | 54 | 61 | 65 |
| | Nitrogen fraction (mass ppm) | 5600 | 5700 | 5700 |
| | Sulfur fraction (mass ppm) | 8700 | 8950 | 8800 |
| | Chlorine fraction (mass ppm) | 17 | 17 | 17 |
| Ratio of product | Second gas fraction (% by mass) | 5 | 5 | 5 |
| | Light fraction (% by mass) | 79 | 81 | 82 |
| | Heavy fraction (% by mass) | 16 | 14 | 12 |
| Characteristic of light fraction | Nitrogen fraction (mass ppm) | 19 | 17 | 16 |
| | Sulfur fraction | 271 | 250 | 230 |

TABLE 2-continued

| Hydrogenolysis step | Example 1 | Example 2 | Example 3 |
|---|---|---|---|
| (mass ppm) | | | |
| Chlorine fraction | 1 | 1 | 1 |
| (mass ppm) | | | |

TABLE 3

| | Steam-cracking step | Example 1 | Example 2 | Example 3 |
|---|---|---|---|---|
| Ratio of product | Ethylene (% by mass) | 17.6 | 17.7 | 17.8 |
| | Propylene (% by mass) | 11.1 | 11.3 | 11.3 |
| | Butadiene, butenes (% by mass) | 8.2 | 8.3 | 8.3 |
| | Isoprene, cyclopentadiene (% by mass) | 2.7 | 2.7 | 2.7 |
| | Benzene, toluene, xylene, ethyl benzene, styrene (% by mass) | 17.7 | 17.6 | 17.5 |
| | Indene, methyl styrene (% by mass) | 4.0 | 3.9 | 3.9 |
| | Heavy distillate (% by mass) | 170. | 16.7 | 16.5 |
| | Light distillate (% by mass) | 21.6 | 21.8 | 22.0 |
| Chemical product yield (% by mass) with respect to total amount of pyrolysis product excluding metal fraction | | 28.6 | 24.9 | 24.3 |
| Yield (% by mass) of raw material for producing carbide with respect to total amount of pyrolysis product excluding metal fraction | | 7.9 | 6.8 | 6.5 |

TABLE 4

| | Pyrolysis step | Comparative Example 1 | Comparative Example 2 |
|---|---|---|---|
| | Pyrolysis temperature | 300° C. | 800° C. |
| Ratio of product | First gas fraction (% by mass) | 1 | 23 |
| | Pyrolysis oil (% by mass) | 31 | 41 |
| | Residual fraction (% by mass) | 68 | 36 |
| Characteristic of pyrolysis oil | IBP (° C.) | 86 | 94 |
| | T10 (° C.) | 160 | 168 |
| | T50 (° C.) | 305 | 325 |
| | T70 (° C.) | 386 | 390 |
| | T90 (° C.) | 481 | 488 |
| | EBP (° C.) | 580 | 612 |
| | Nitrogen fraction (mass ppm) | 3800 | 6100 |
| | Sulfur fraction (mass ppm) | 8550 | 9400 |
| | Chlorine fraction (mass ppm) | 64 | 17 |
| Yield (% by mass) of powdered carbide | | 0 | 36 |

TABLE 5

| | Hydrogenolysis step | Comparative Example 1 | Comparative Example 2 |
|---|---|---|---|
| Characteristic of raw material oil | High-boiling-point raw material (% by mass) | 38 | 42 |
| | Low-boiling-point raw material (% by mass) | 62 | 58 |
| | Nitrogen fraction (mass ppm) | 3800 | 6100 |
| | Sulfur fraction (mass ppm) | 8550 | 9400 |
| | Chlorine fraction (mass ppm) | 64 | 17 |

TABLE 5-continued

| | Hydrogenolysis step | Comparative Example 1 | Comparative Example 2 |
|---|---|---|---|
| Ratio of product | Second gas fraction (% by mass) | 5 | 5 |
| | Light fraction (% by mass) | 81 | 78 |
| | Heavy fraction (% by mass) | 13 | 17 |
| Characteristic of light fraction | Nitrogen fraction (mass ppm) | 11 | 26 |
| | Sulfur fraction (mass ppm) | 233 | 276 |
| | Chlorine fraction (mass ppm) | 4 | 1 |

TABLE 6

| | Steam-cracking step | Comparative Example 1 | Comparative Example 2 |
|---|---|---|---|
| Ratio of product | Ethylene (% by mass) | 17.8 | 17.7 |
| | Propylene (% by mass) | 11.3 | 11.2 |
| | Butadiene, butenes (% by mass) | 8.3 | 8.2 |
| | Isoprene, cyclopentadiene (% by mass) | 2.7 | 2.7 |
| | Benzene, toluene, xylene, ethyl benzene, styrene (% by mass) | 17.5 | 17.6 |
| | Indene, methyl styrene (% by mass) | 3.9 | 3.9 |
| | Heavy distillate (% by mass) | 16.7 | 16.8 |
| | Light distillate (% by mass) | 21.9 | 21.8 |
| Chemical product yield (% by mass) with respect to total amount of pyrolysis product excluding metal fraction | | 15.5 | 19.6 |
| Yield (% by mass) of raw material for producing carbide with respect to total amount of pyrolysis product excluding metal fraction | | 4.2 | 5.4 |

From Examples 1 to 3 described above, it is checked that an excellent chemical product yield can be attained, and the carbide can also be efficiently obtained by the present invention.

REFERENCE SIGNS LIST

1: heat exchanger, 2: pyrolytic furnace, 3: oxygen-free gas supply source, 4: circulation route, 5: oil fraction recovery apparatus, 6: waste material, 7: decomposer, 8: outside heater, 9: flowmeter, 10: damper, 11: air blower, 12: dry distillation tower, 13: recovery tank, 14: air-heating furnace, 15: exhauster, 16: exhaust gas treatment apparatus, 100: system, 110: pyrolysis unit, 111: first separation unit, 112: pulverization unit, 120: hydrogenolysis unit, 121: second separation unit, 130: steam cracker, 140: carbide production unit, S1: waste material, S2: first gas fraction, S3: pyrolysis oil, S4: mixture of residual fraction and metal fraction, S5: residual fraction, S6: metal fraction, S7: powdered carbide, S8: second gas fraction, S9: hydrogenolysis oil, S10: light fraction, S11: heavy fraction, S12: produced gas, S13: produced oil, S14: heavy distillate, S15: carbide.

The invention claimed is:

1. A method for producing chemical products and carbides, comprising:

pyrolysis by obtaining a first gas fraction, a pyrolysis oil, and a residual fraction by pyrolysis of a crushed material of waste tires;

carbide recovery by recovering a carbide from the residual fraction;

hydrogenolysis by obtaining a second gas fraction, a light fraction with a boiling point of 350° C. or lower, and a heavy fraction with a boiling point higher than 350° C.

by hydrogenolysis of a raw material oil containing at least a part of the pyrolysis oil; and steam-cracking by obtaining a chemical product and a raw material for producing a carbide consisting of a heavy distillate with a 10% distillation temperature of 190° C. or higher by steam cracking of a steam-cracking raw material oil containing at least a part of the light fraction, wherein a pyrolysis temperature of the pyrolysis is 350 to 750° C., and in the hydrogenolysis, the raw material oil contains a low-boiling-point raw material with a boiling point of 350° C. or lower and a high-boiling-point raw material with a boiling point higher than 350° C., and a content of the high-boiling-point raw material is 15% by mass or more on the basis of a total amount of the raw material oil.

2. The method according to claim 1, wherein in the pyrolysis, an amount of the pyrolysis oil with respect to a total amount of the first gas fraction, the pyrolysis oil, and the residual fraction is 40% by mass or more.

3. The method according to claim 1, wherein in the pyrolysis, an amount of the first gas fraction with respect to a total amount of the first gas fraction, the pyrolysis oil, and the residual fraction is 25% by mass or less.

4. The method according to claim 1, wherein in the pyrolysis, an amount of the pyrolysis oil with respect to a total amount of the first gas fraction, the pyrolysis oil, and the residual fraction is 80% by mass or less.

5. The method according to claim 1, wherein in the pyrolysis oil, a 10% distillation temperature is 90° C. or higher, and a 90% distillation temperature is 350° C. or higher.

6. The method according to claim 1, wherein in the hydrogenolysis, the content of the high-boiling-point raw material in the raw material oil is 70% by mass or less on the basis of the total amount of the raw material oil.

7. The method according to claim 1, wherein the hydrogenolysis includes performing hydrogenolysis on the raw material oil in the presence of a hydrogenolysis catalyst.

8. The method according to claim 7, wherein the hydrogenolysis catalyst includes a Ni-based catalyst.

9. The method according to claim 1, wherein in the hydrogenolysis, a nitrogen fraction in the raw material oil is 2000 mass ppm or more, and a nitrogen fraction in the light fraction is 25 mass ppm or less.

10. The method according to claim 1, wherein the raw material oil in the hydrogenolysis is the pyrolysis oil.

11. The method according to claim 1, further comprising carbide production by obtaining a carbide by pyrolysis or incomplete combustion of the raw material for producing a carbide.

* * * * *